US009026534B2

(12) United States Patent
Kausik (10) Patent No.: US 9,026,534 B2
(45) Date of Patent: May 5, 2015

(54) METHOD AND SYSTEM TO COLLECT AND SEARCH USER-SELECTED CONTENT (75) Inventor: Balas Natarajan Kausik, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1633 days.

(21) Appl. No.: 11/186,303

(22) Filed: Jul. 21, 2005

(65) Prior Publication Data
US 2006/0020587 A1 Jan. 26, 2006

Related U.S. Application Data (60) Provisional application No. 60/589,629, filed on Jul. 21, 2004.

(51) Int. Cl.
*G06F 17/30* (2006.01)

(52) U.S. Cl.
CPC ............... *G06F 17/30884* (2013.01)

(58) Field of Classification Search
USPC ............... 707/3, 4, 5, 6, 7, 101, 102; 709/217
See application file for complete search history.

(56) References Cited

U.S. PATENT DOCUMENTS

| 6,151,624 | A * | 11/2000 | Teare et al. ............... 709/217 |
| 6,571,295 | B1 * | 5/2003 | Sidana ............... 709/246 |
| 6,581,039 | B2 * | 6/2003 | Marpe et al. ............... 705/7 |
| 6,643,641 | B1 * | 11/2003 | Snyder ............... 707/4 |
| 6,826,559 | B1 * | 11/2004 | Ponte ............... 707/3 |
| 6,990,631 | B2 * | 1/2006 | Narahara ............... 715/511 |
| 7,047,242 | B1 * | 5/2006 | Ponte ............... 707/10 |
| 7,065,519 | B2 * | 6/2006 | Yamaguchi ............... 707/3 |
| 7,093,012 | B2 * | 8/2006 | Olstad et al. ............... 709/224 |
| 7,107,285 | B2 * | 9/2006 | von Kaenel et al. ....... 707/104.1 |
| 7,165,119 | B2 * | 1/2007 | Fish ............... 709/246 |
| 7,181,445 | B2 * | 2/2007 | Bebo et al. ............... 707/3 |
| 7,225,180 | B2 * | 5/2007 | Donaldson et al. ............... 707/3 |
| 7,284,008 | B2 * | 10/2007 | Henkin et al. ............... 707/102 |
| 2002/0178154 | A1 * | 11/2002 | Shirota ............... 707/3 |
| 2003/0061201 | A1 * | 3/2003 | Grefenstette et al. ............. 707/3 |
| 2003/0069799 | A1 * | 4/2003 | Hoffman et al. ............... 705/26 |
| 2004/0030682 | A1 * | 2/2004 | Porter et al. ............... 707/3 |

(Continued)

OTHER PUBLICATIONS http://myweb2.search.yahoo.com/myresults/snapshot, web product snapshot, Yahoo! Inc.,(Apr. 27, 2005),n. pag.

(Continued)

*Primary Examiner* — Mohammad S Rostami
(74) *Attorney, Agent, or Firm* — Meunier Carlin & Curfman, LLC (57) ABSTRACT

A method and system to provide search results via a network is described. The method may comprise receiving a search request from a user including search criteria, searching cached World Wide Web documents to obtain a web result based on the search criteria, and searching for an associated document to obtain a restricted result based on the search criteria. The associated document may be associated with the user (e.g., the user may mark or otherwise identify the document after viewing it) and access to the associated document may be restricted. The web result and the restricted result may be communicated to the user for viewing via a web browser. In an example embodiment, the user may be provided via a web interface with an option to search the World Wide Web or a database including associated documents.

32 Claims, 7 Drawing Sheets

(56) References Cited

U.S. PATENT DOCUMENTS

| | | | |
|---|---|---|---|
| 2004/0064442 A1* | 4/2004 | Popovitch | 707/3 |
| 2004/0122790 A1* | 6/2004 | Walker et al. | 707/1 |
| 2004/0143569 A1* | 7/2004 | Gross et al. | 707/3 |
| 2005/0055341 A1* | 3/2005 | Haahr et al. | 707/3 |
| 2005/0060311 A1* | 3/2005 | Tong et al. | 707/7 |
| 2005/0086583 A1* | 4/2005 | Obata et al. | 715/501.1 |
| 2005/0114357 A1* | 5/2005 | Chengalvarayan et al. | 707/100 |
| 2005/0120180 A1* | 6/2005 | Schornbach et al. | 711/133 |
| 2005/0131866 A1 | 6/2005 | Badros et al. | |
| 2005/0182773 A1* | 8/2005 | Feinsmith | 707/100 |
| 2005/0216468 A1* | 9/2005 | Fujiwara et al. | 707/9 |
| 2005/0234895 A1* | 10/2005 | Kramer | 707/3 |
| 2005/0283468 A1* | 12/2005 | Kamvar et al. | 707/3 |
| 2006/0106769 A1* | 5/2006 | Gibbs | 707/3 |

OTHER PUBLICATIONS

LexusNexus Total Search, White Paper, Lexus Nexus,(2003), 17 p.

"Using JavaScript to Search For and Highlight Text on a Web Page", http://www.nsftools.com/misc/SearchAndHighlight.htm, NSF Tools (Oct. 2003),n. pag.

"Yahoo! search adds personal search and collaboration capabilities to web search", http://docs.yahoo.com/docs/pr/release1232.html, Press Release, Yahoo! Inc.,(Apr. 27, 2005),n. pag.

Carmack, C. , "Web Destinations: Do you Yahoo! or Google?", *PC Today, 3,* Obtained from http://www.pctoday.com/editorial/article.asp?article=articles/2005/t0309/03t09/03t09.asp&guid=, (Sep. 2005), 16-17.

* cited by examiner

METHOD AND SYSTEM TO COLLECT AND SEARCH USER-SELECTED CONTENT

RELATED APPLICATION

This application claims priority from a provisional application entitled: "Method And Apparatus For Web Search Personalization Via Collection And Incorporation Of User Selected Content", filed on Jul. 21, 2004, Ser. No. 60/589,629, the entire contents of which is included herein by reference.

TECHNICAL FIELD

This application relates to a method and system to collect and search user-selected content.

BACKGROUND

The amount of information available to a computer user is growing rapidly each day. Search engines may help the user in searching and accessing information. The user may search based on keywords for any relevant web pages the search engines may have cached.

Search engines may rank search results in order of popularity, but also may rank the search results in order of web pages associated with the highest payment received by the search engine. As a result, users may find the search results irrelevant or unhelpful.

Often users bookmark or otherwise save web pages, and/or links to web pages. Over time, the user may accumulate a large number of web pages/links that may become disorganized, unmanageable or difficult to manoeuvre through to find the desired link. Further, the user may accumulate a large number of emails or other types of documents, personal and/or professional, that may become disorganized, unmanageable or difficult to manoeuvre through to find the desired document.

SUMMARY

A method and system to process search results is provided.

Other features will be apparent from the accompanying drawings and from the detailed description that follows.

BRIEF DESCRIPTION OF DRAWINGS

Embodiments of the present invention are illustrated by way of example and not limitation in the figures of the accompanying drawings, in which like references indicate similar elements and in which.

DETAILED DESCRIPTION

In an example embodiment, there is provided a method and system to receive at least one user-selected document into a collection of user-selected documents on a storage device; receive a search request to search the limited access collection and cached web pages from a client machine; and responsive to receiving the search request, publish a search result set on an interface of the client machine, the search result set including a reference selected from a group including the at least one document from the collection and the cached web pages.

"Document" as used herein may include electronic mail correspondence, text documents, and/or any other digital content. Those skilled in the art will appreciate that any computer-readable medium including text documents, images, audio, and other multimedia may be included as a "document." In an example embodiment, the definition of document may depend on a specific application domain.

In the following detailed description of example embodiments, reference is made to the accompanying drawings which form a part hereof, and in which is shown by way of illustration specific embodiments in which the example method and system may be practiced. It is to be understood that other embodiments may be utilized and structural changes may be made without departing from the scope of this description.

In an example embodiment, a user may identify documents (e.g., web pages) and store the documents associated with the user (or a group of users) for subsequent retrieval. As will be discussed in more detail below by way of example, the storage of the associated documents may be centralized or distributed across one or more servers and/or the user's desktop. When the user subsequently searches (e.g., conducts an Internet search) using search criteria, search engine results from the World Wide Web (WWW) and from the stored documents associated with the user may be combined and presented to the user (e.g., via the user's web browser). In an example embodiment, search engine results may include in multiple users' collections (e.g., documents stored by other users in a group which the user is part of).

Example Platform Architecture

Figure 1A:
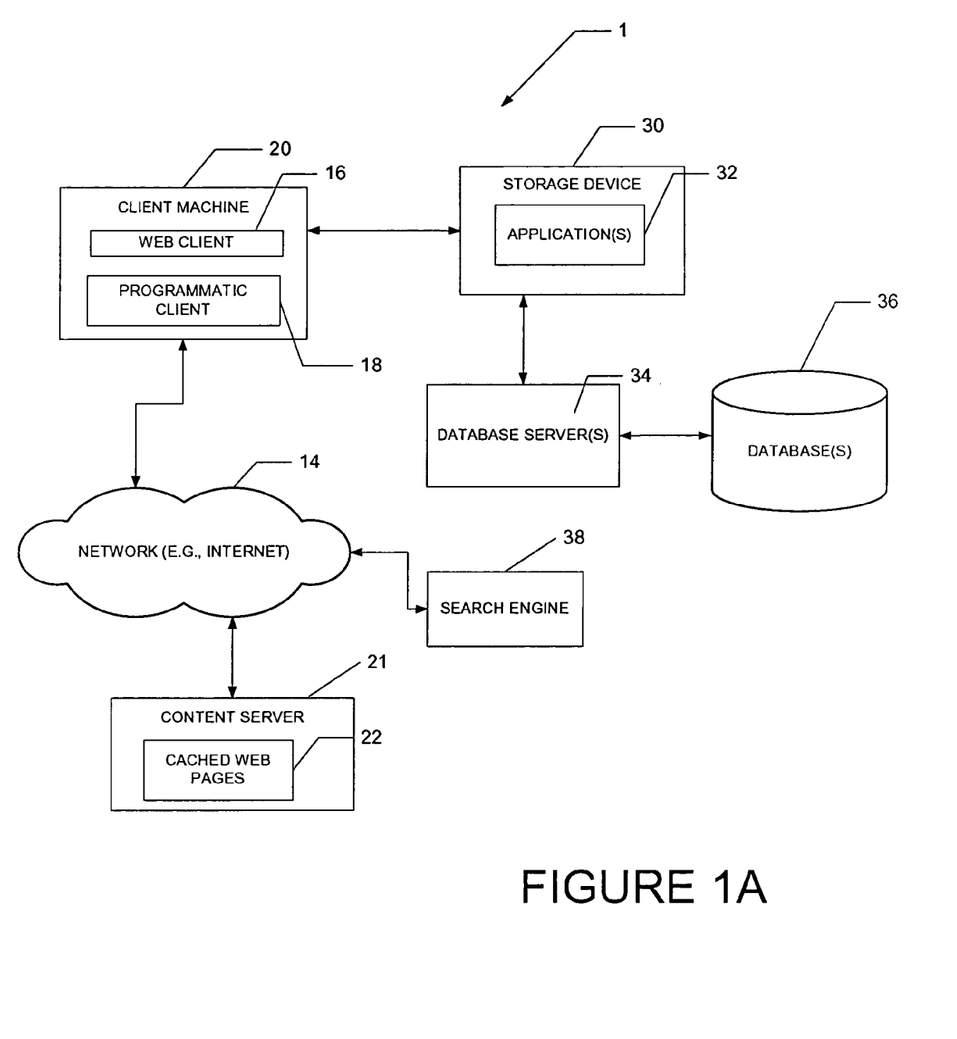
FIGS. 1A and 1B illustrate respective network diagrams depicting systems, according to example embodiments, having a client-server architecture.

FIG. 1A illustrates a network diagram depicting a system 1 having a client-server architecture, according to an example embodiment.

A client machine 20 may access, via a network 14, a content server 21 and a search engine 38. For example, the network 14 may be the Internet, a public or private telephone network (wired or wireless), a private wireless network using technologies such as Bluetooth or IEEE 802.11x or other networks, or any other network.

The content server 21 may include documents available to users via the network 14 and may include cached web pages and/or actual web pages. The search engine 38 may search the documents or cached web pages of the content server 21 upon a search request, for example, an Internet search request from user via a web browser.

The client machine 20 may access a storage device 30 to store a user-selected document in a collection. For example, the user-selected document may be a document communicated to a user conducting an Internet search. The storage device 30 may include one or more application(s) 32. The storage device 30 may also access one or more database(s) 36 via one or more database server(s) 34. The one or more database(s) 36 may include the collection of user-selected documents associated with the user. The search engine 38 may search the user-selected documents of the one or more database(s) 36 upon a search request.

The client machine 20 may be selected from a group including a laptop computer, a desktop computer, a tablet PC, a set-top box (STB), a Personal Digital Assistant (PDA), wireless devices such as a Smartphone, or a cellular telephone, or the like. The client machine 20 may be browser-enabled.

In an example embodiment, the client machine 20 includes a web client 16 and a programmatic client 18. The web client 16 may be a browser, such as the Internet Explorer® browser by Microsoft®, Firefox® browser by Mozilla®, or any other browser. The programmatic client 18 may include one or more module (s) for executing on the one or more client machines 20 to facilitate communication, storage and/or searching features with the network 14 and/or the storage device 30.

Figure 1B:
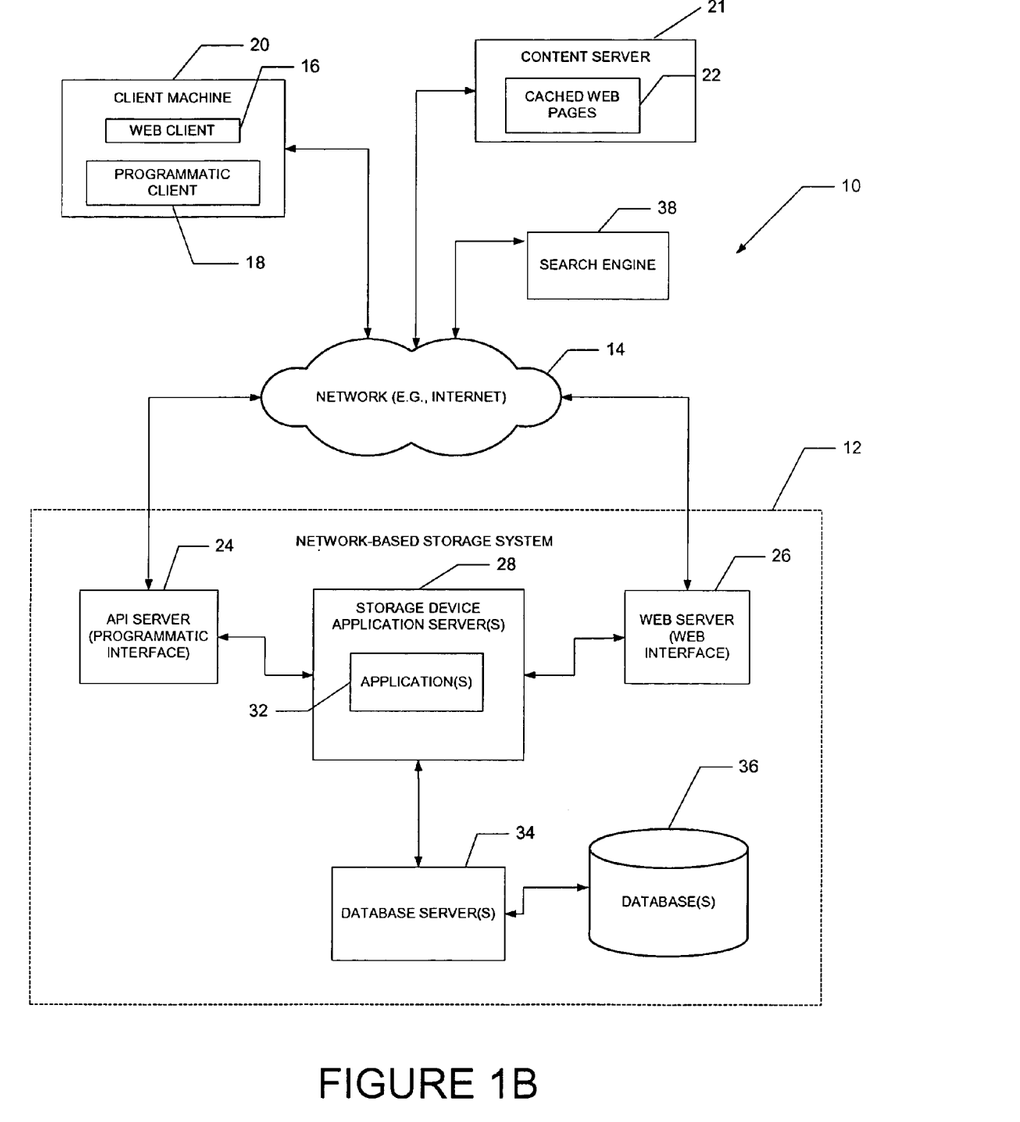

In the embodiment shown, the storage device 30 is not coupled to the network 14. However, the storage system 12 of FIG. 1B is shown as being coupled to the network 14. The storage device 30 or storage system 12 may be selected from a group including a personal computer, a repository, an external memory device, and/or an auxiliary server, each of which may or may not be coupled to the network 14 (or any other network), depending upon the application.

The documents of the storage device 30 may be protected behind a firewall. As opposed to documents available from the content server 21 which may be freely available on the World Wide Web, the documents of the storage device 30 may not be publicly accessible. Accordingly, access to the documents of the storage device 30 may be restricted or limited to an individual user or a selected group of users. Thus, the documents of the storage device 30 (e.g., stored in the database 36) may be accessible only by members of a group and, accordingly, access to the documents may be semi-private or limited.

The example embodiments described herein may be implemented on one or more computers that are connected by a network. Such computers may or may not be in a distributed computing environment.

FIG. 1B illustrates a network diagram depicting a system 10 having a client-server architecture, according to an example embodiment. Similar reference numerals depict similar features in the Figures, and therefore differences between FIG. 1A and FIG. 1B are emphasized in the following description of FIG. 1B.

A system, in the example form of a network-based storage system 12 is accessible via the network 14 to one or more clients 20. Further, while the system 10 shown in FIG. 1B employs a client-server architecture, embodiments are of course not limited to such an architecture, and could equally well find applications in a distributed, or peer-to-peer, architecture system. The various applications could also be implemented as standalone software programs, which do not necessarily have networking capabilities.

Turning to the network-based storage system 12, an Application Program Interface (API) server 24, and a web server 26 may be coupled to, and may provide programmatic, and web interfaces, respectively to, one or more storage device application servers 28. The client machine(s) 20 may use one or more of these interfaces to access the storage device application server(s) 28.

For example, a web client 16 may access the application server(s) 28 via the web interface supported by the web server 26. The web interface may include a web browser interface to communicate with the web client 16. Similarly, the programmatic client 18 may access the various services and functions provided by the application server(s) 28, via the programmatic interface provided by the API server 24. In an additional embodiment, an application supported by one or more applications of the storage device application server(s) may be downloadable to the client machine 20. The programmatic client 18 and/or the web client 16 of the client machine 20 may host the interface associated with the one or more applications of FIG. 2, for example as shown in FIG. 3.

The user-selected content collection (associated documents) may be stored on the storage device 30 and/or via the network-based storage system 12, depending upon the application. The network-based storage system 12 may be considered similar to the storage device 30; however, the network-based storage system 12 is coupled with the network 14. The documents of the storage system 12 may be protected behind a firewall, for example. The documents of the storage system 12 may be publicly accessible in some embodiments. The documents of the storage system 12 may be considered to be a subset of the documents accessible via the World Wide Web.

Example Application Server(s)

Figure 2:
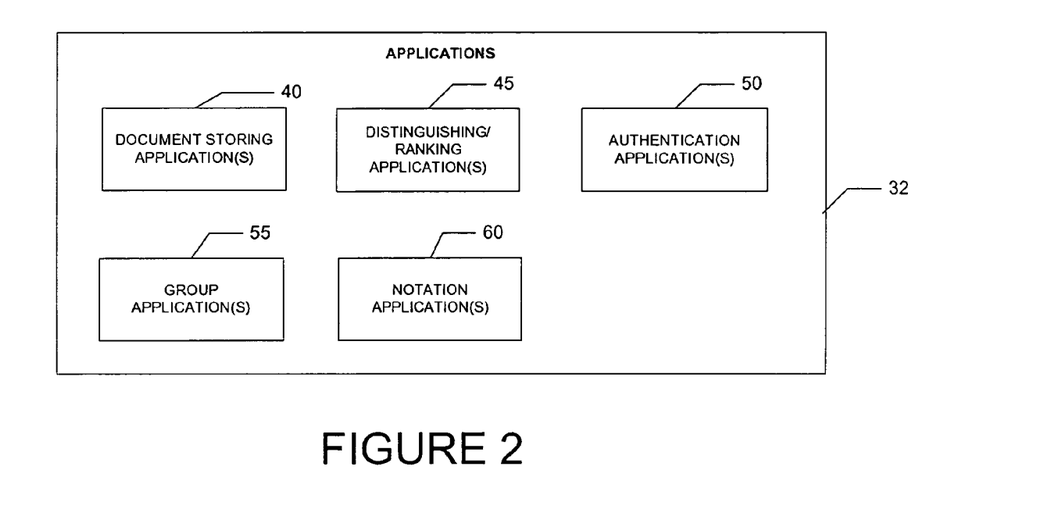
FIG. 2 illustrates a block diagram of applications of a network-based storage system and storage device(s), according to an example embodiment.
Figure 3:
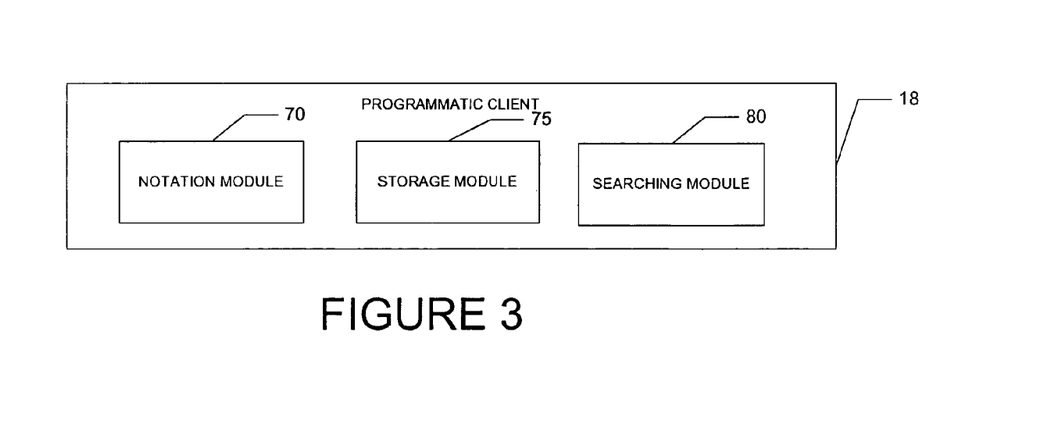
FIG. 3 illustrates a block diagram of modules associated with a programmatic client of a client machine, according to an example embodiment.

FIG. 2 illustrates a block diagram of one or more applications 32 associated with the storage device 30 and/or the network-based storage system(s) 12, according to an example embodiment. For the network-based storage system(s) 12, the application(s) 32 may be hosted by the application server(s) 28 of the network-based storage system 12.

The application(s) 32 may include one or more document storing application(s) 40. The document storing application(s) 40 may facilitate storage of documents into the storage device 30 or storage system 12. The document storing application(s) 40 may further communicate with a storage module 75 of the programmatic client 18 in the storage process as described in more detail herein. The user may store documents using a storage feature 275 (see FIG. 5), as described in more detail herein.

The application(s) 32 may include one or more distinguishing/ranking application(s) 45. The distinguishing/ranking application(s) 45 may facilitate displaying documents in order of relevance to a user in a search result set. The application(s) 45 may adjust the search results according to criteria, such as origin of documents, or specified document ranking. The user may determine ranking selections in a ranking selection feature 240 (see FIG. 5), as described in more detail herein.

The application(s) 32 may include one or more authentication/authorization application(s) 50. Before a document may be stored in a particular collection, the user (or client machine 20) requesting the storage may be verified using one of various verification mechanisms. Similarly, before a search through a collection may be performed, the user requesting the search may be verified, for example, utilizing a user ID, cookie, or the like.

The application(s) 32 may include one or more group application(s) 55. The group application(s) may facilitate managing and joining groups, group membership criteria, group sharing criteria, among other group activities. The group application(s) 55 may interface with the example group tables of the database(s) 36.

The application(s) 32 may include one or more notation application(s) 60. A notation may be associated with a user-selected document when stored into the collection. For example, a user may notate a document (e.g., a web page) prior to requesting storage of the document by adding text comments or the like) and these notation may be included in search criteria used by a search engine when searching keywords and/or when presenting search results. The notation may be used by the search engine upon the search request. The notation associated with the particular document may be displayed in the search result set. The notation application(s) 60 may correspond to a notation module 70 of the programmatic client 18.

FIG. 3 illustrates a block diagram of one or more modules associated with the programmatic client 18 of the client machine 20, according to an example embodiment. These one or more modules of the client machine 20, for example, a notation module 70, a storage module 75, and a searching module 80, facilitate communication with corresponding applications, for example, the notation application(s) 60, and the document storing application(s) 40, of the storage device 30 or storage system 12 and/or with application(s) of the search engine 38.

Example Data Structures

Figure 4:
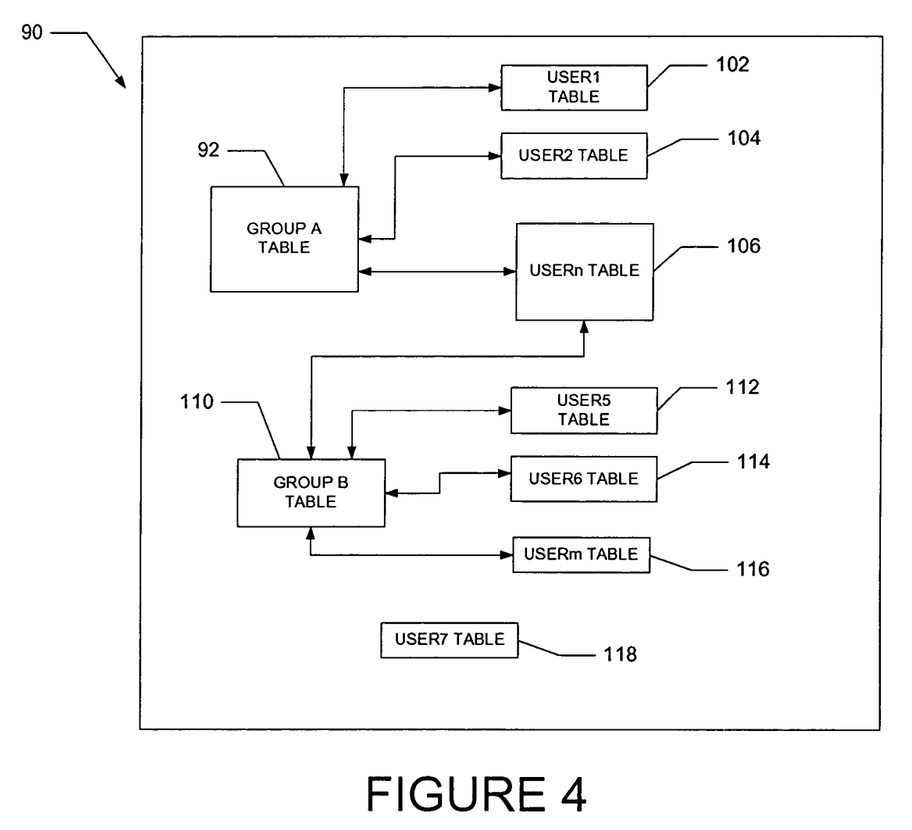
FIG. 4 illustrates a high-level entity-relationship diagram, illustrating various tables that may be maintained within one or more databases, according to an example embodiment.

FIG. 4 illustrates a high-level entity-relationship diagram, illustrating various tables 90 that may be maintained within the one or more databases 36 according to an example embodiment. The tables 90 may be utilized by and support the application(s) of the application server(s).

The tables 90 may include one or more group tables and one or more user tables. The application(s) 32 may access the collections on the tables through the database server(s) 34.

In an example embodiment, there are one or more group tables, each may contain a record of each user in the particular group. A Group A Table 92 may contain a record of each user, including User1, User2 ... User n. The Group A Table 92 may additionally contain each associated document from each of the collections of the associated users. The Group A Table 92 may additionally contain information regarding whether each of the documents within Group A are public, private, such as exclusive to the user, or semi-private, such as only members from the Group A may view the documents. Thus, tables may be used to define access privileges to the associated documents.

The Group A Table 92 may, for example, be associated with user tables, User1 Table 102, User2 Table 104, and User n Table 106. A Group B Table 110 may, for example, be associated with user tables, User5 Table 112, User6 Table 114, and User m Table 116.

User 7 Table 118 may not be associated with any Group. The document(s) listed in User 7 Table may not be accessible by those other than User 7. In an additional embodiment, the document(s) listed in User 7 Table may be accessible by certain users and/or by the public.

Each user table may contain user identification information, associated group(s) information, and/or stored document(s). For example, User n Table 106 may include each of the documents stored by User n, as well as which of these documents are viewable by the Group A, which of these documents are accessible by the Group B, and the associated security levels with each of these documents. The security levels may include the following: public (e.g., accessible by the WWW), private (e.g., exclusively viewable by the user), or semi-private (e.g., only members of a particular group such as the Group A may view the documents).

Figure 5:
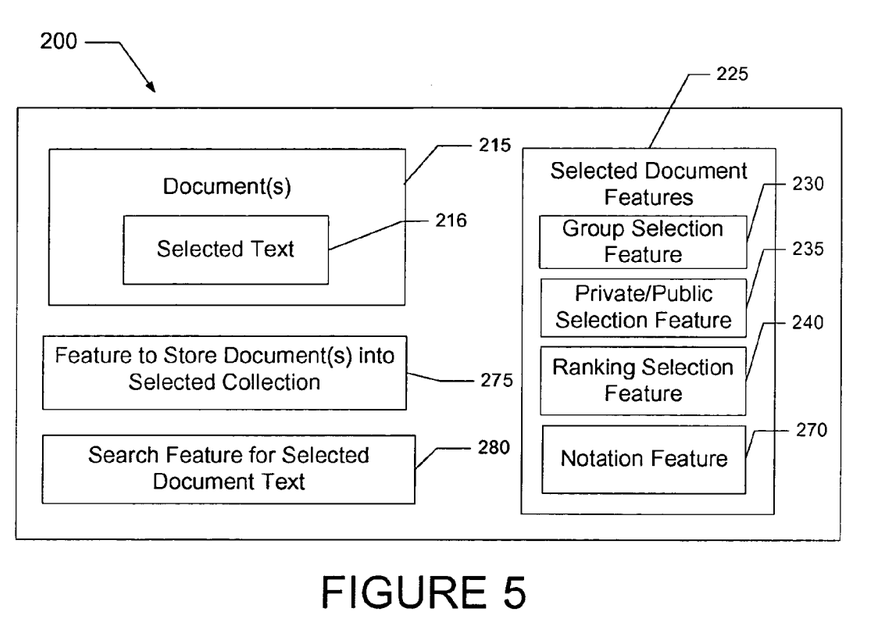
FIG. 5 illustrates an interface of a client machine, according to an example embodiment.

FIG. 5 illustrates a graphical user interface 200 of a client machine, according to an example embodiment. The interface 200 includes a document 215. A user may decide to store this document 215 into the user's collection utilizing the storage module 75 on the storage device 30 or storage system 12. In an example embodiment, the document 215 may be automatically stored utilizing the storage module 75, for example if predefined criteria are met.

The interface 200 may include various selected document features 225 associated with storing a document, such as a group selection feature 230, a privacy level selection feature 235, a ranking selection feature 240, and a notation feature 270. These features 225 may be set to a default and/or may be activated by the user for each document to be stored into the collection.

The one or more feature(s) may include a group selection feature 230, wherein a document may be added to a collection associated with a particular group. The particular collection of documents may be accessible by members of the particular group. The group may include one or more user members as designated in the tables 90. Users may associate themselves into groups, so that users in that group may gain access to content stored by other members of the group. Thus, if one user in a group stores a document and ranks the document as important, searches conducted by other members of the group, using appropriate search criteria, would return the stored document.

The one or more feature(s) may also include a privacy level selection feature 235, where a privacy level associated with a stored document may be selected. The privacy level may be exclusive to the user, may be exclusive to a selected group, and/or may be accessible to the public. When the privacy level may be exclusive to the user, and/or may be exclusive to a selected group, the document collection may be privacy protected by software or hardware mechanisms. In an additional example, only the user or a member of the group specified by the user may access the document. Users may be required to log in and identify themselves prior to access.

Within a collection of documents associated with a user (or group associated with the user), there may be documents with various privacy levels, such as private, public and semi-private that may be accessible by a selected group. In an additional embodiment, each document that is public may be uploaded into a public group, and each document that is private may be uploaded into a private group with one or more members. In this way, the storage device 30 or storage system 12 may allow users to associate access privileges to the content stored thereon. Content denoted as private may only be visible to that user, while content marked as public may be visible to all users, or to designated groups of users.

The one or more feature(s) may include a ranking selection feature 240 where a selection may be made for a document, for example, a high rank or a low rank, based on user criteria. The ranking may be used in the search result set to display relevant documents in order based on ranking. Thus, for example, other members of a group may receive search results based on a ranking any one of the members has attributed to an associated document.

The one or more feature(s) may also include a notation feature 270 to generate a notation associated with the document. The notation feature 270 on the interface 200 corresponds to the notation module 70 of the programmatic client 18. As mentioned above, notations added to documents by a user may be used by the search engine 38 to search. Any notations of an associated document may also be displayed in a search result set.

The interface 200 may also include a feature 275 to store document(s) into a selected collection. The storage feature 275 activates the storage module 75 to communicate with the document storing application(s) 40 to store the document(s) onto the storage device 30 or storage system 12.

The feature 275 may include a menu on the interface 200 accessed by, for example, a button associated with user input. The button may be a mouse button, a button on a keyboard, or on a tracking ball, for instance. The menu may include a selection to indicate storage of the document into a selected collection. In another embodiment, the document may be stored into the collection by activating a document capture or "save" feature in a browser. In yet another embodiment, the document may be stored into the collection using a drag-n-drop storage feature. The drag-n-drop storage feature may include selecting the document(s) to be stored in the collection using, for example, a mouse, dragging the document(s) to a collection drop-off feature and dropping or, for example, releasing, the mouse button at the collection drop-off feature.

In yet another embodiment, the document may be stored into the collection automatically. For example, documents saved onto a hard drive of the client machine 20 may be automatically stored into a default collection. In a further embodiment, as documents are viewed (e.g., while a user is browsing the Internet), similar to saving the documents into a temporary memory, the documents may be automatically stored into the default collection, such that previously viewed documents are stored into the collection without any action from the user.

Either through a software agent, such as the storage module 75, or through browser scripting, uploading of documents to the collection on the storage device 30 or storage system 12 may be performed in a "lazy" manner. For example, the upload may not take place immediately as the user selects the document for upload, or as the user views the document, rather the upload may take place at a trickle rate or asynchronously. Uploads in a "lazy" manner may minimally impact the performance of the user's desktop and network connection while storing the documents.

The interface 200 may, for example, include a feature 280 to facilitate searching for document(s) in cached web pages and/or in one or more collections. The searching feature 280 on the interface 200 corresponds to the searching module 80 of the programmatic client 18.

In the document(s) 215, there may be selected text 216, such as highlighted text. The text may be highlighted by holding down a button and "dragging" the cursor through the text to be selected and then releasing the button or feature. The searching feature 280 may be activated through a menu accessed through a user input button or a key, such as function key F1 on a keyboard, and/or a button on the browser. The feature 280 may be activated, while the text 216 is selected, to conduct a search (of a collection or WWW or cached web pages) based on the selected text. The search may be a keyword search and/or a selected text search.

Figure 6:
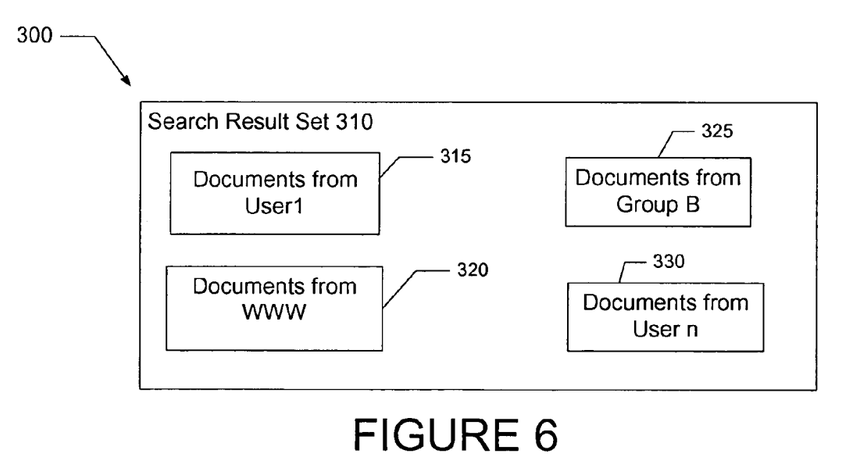
FIG. 6 illustrates an interface of a search result set, according to an example embodiment.

FIG. 6 illustrates an interface 300 of a search result set 310, according to an example embodiment. The search result set 310 may be published or displayed on a display of the client machine 20. The search result set 310 may be displayed in response to a search request, as described herein.

One or more groups may be presented in the search result. For example, a first group may include documents accessed through the WWW outside of the storage device 30 or storage system 12 that are relevant to the search term(s) or criteria, and a second group may include documents accessed through the storage device 30 or storage system 12 that are relevant to the search term(s). The two groups may be indistinguishable on the search result set, may be ranked according to user-selected ranking criteria (e.g., for the documents identified in the collection), and may be distinguishable based on origin, for instance, based on from which collection they came.

The search results set may attribute owner/user information when presenting search results from the storage device 30 or storage system 12. Such owner information may also be used by the search engine 38 to rank the search results, such that a user may rank search results obtained from users with whom he/she is familiar.

In this embodiment, the search result set 310 includes documents from various sources, each distinguished from each other, including documents from User1 315, documents from web pages (WWW or cached) 320, documents from Group B 325 (which may include documents from User N 330), and documents from User N 330. The search result set may be ranked in order of relevance to search terms, in order of document origin, and/or individually ranked where some of the documents from User 1, for example, may be ranked low due to unhelpfulness or irrelevance.

In this example the user has access to documents from collections of User 1, User N, and Group B. Each document in the collection of User N, for example, may not be accessible in this search result set in that certain documents, such as confidential email correspondence, may be marked as private or otherwise not accessible to others.

Figure 7:
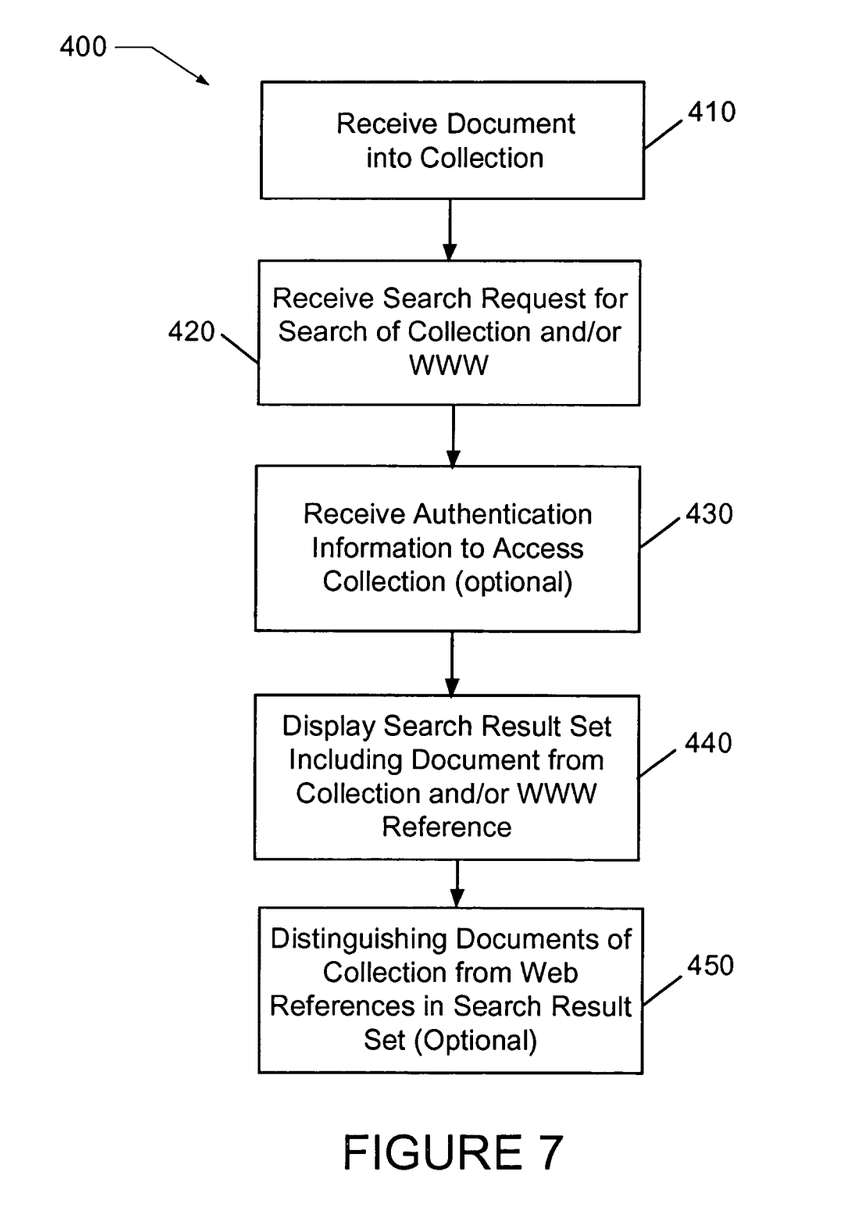
FIG. 7 illustrates a flowchart of a method, according to an example embodiment.

FIG. 7 illustrates a flow chart of a method 400, according to an example embodiment.

At block 410, a document (e.g., associated or identified by a user) is received into a collection, as described herein. The collection may be on the storage device 30 and/or the network-based storage system 12. The document may be "user-selected," which may include either active selection of the document to store in the storage device/system and passive selection and storing of the document through automatic uploading to the storage device 30 or storage system 12. Each document received into the collection may have limited access, as defined by the user, or as a default or preset for the automatic uploads. Accordingly, the documents in the collection identified as being relevant by the search engine 38 may provide a restricted result based on the search criteria. The search result may be termed a restricted result as access to the documents may be limited to only those user having access rights or associated with the document.

At block 420, a search request including search criteria (search terms) is received to search a selected collection. In an example embodiment, the search request may be to search the WWW along with the collection using the search terms or criteria.

At block 430, authorization/authentication information may optionally be received from the client machine to access the collection, such as the limited access collection.

At block 440, a search result set (shown in FIG. 6) may be displayed and/or published. The search result set may be displayed on the user interface 300 responsive to receiving the search request. The search result set may include a document from the collection. The search result set may additionally include a reference from the WWW.

At block 450, a document or reference in the search result set (shown in FIG. 6) may optionally be distinguished based on origin, for example, whether the document is from a certain collection or whether the reference is from the WWW. As described herein, the search result set may include (and distinguish) documents of multiple collections when the search request includes a search of the multiple collections.

In embodiments described herein, users may bookmark or otherwise save web pages, links to web pages, and various other documents to the client machine 20. Often, these documents are of great interest and usefulness to the user, but are not necessarily the most popular (or highest paying) web site on the subject. If the user does not save the document, or cannot recall where he/she may have saved the document, a search of the WWW may not be helpful. In embodiment described herein, the documents are saved to the storage device 30 or storage system 12 for subsequent searching. Notations may be added to the documents for ready identification of the documents. Further, many client machines 20 may also have access to this collection, in some embodiments, when the storage device/system is coupled to a network. The search results may be distinguished based on origin of the documents in the search result set.

Figure 8:
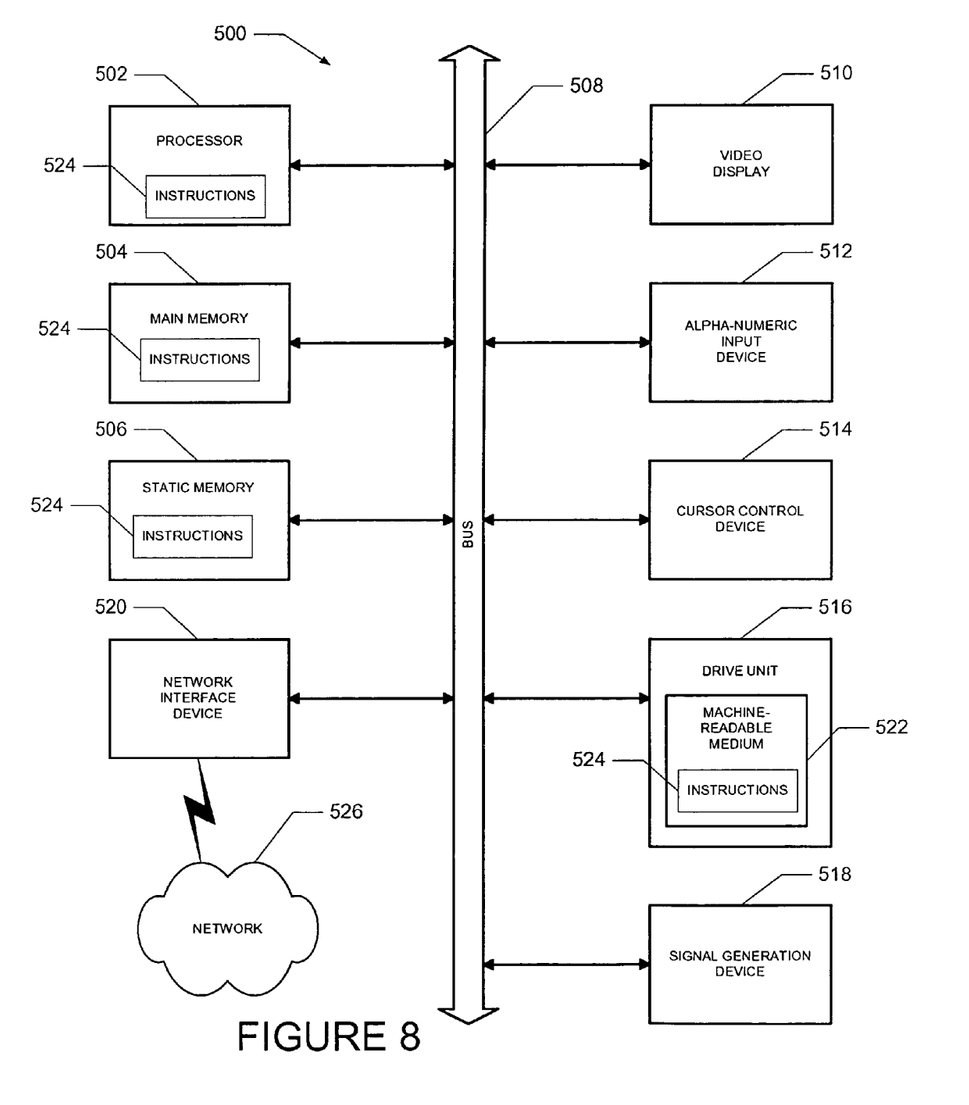
FIG. 8 illustrates a diagrammatic representation of a machine in the form of a computer system within which a set of instructions, for causing the machine to perform any one or more of the methodologies discussed herein, may be executed, according to an example embodiment.

FIG. 8 shows a diagrammatic representation of machine in the example form of a computer system 500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520 utilizing any one of a number of well-known transfer protocols (e.g., HTTP).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions.

The term "machine-readable medium" shall accordingly be taken to include, but not be limited to, solid-state memories, and optical and magnetic media. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method of providing search results via a private network coupled to an Internet via a firewall, the method comprising:
   storing a first plurality of World Wide Web (WWW) documents into a first collection in a storage area of the private network, the first plurality of WWW documents having been previously viewed and selected by a first user as a result of a first Internet search and the first plurality of WWW documents including a first web page, access from the Internet to the first plurality of WWW documents being restricted via the firewall;
   storing a second plurality of WWW documents into a second collection in the storage area, the second plurality of WWW documents having been previously viewed and selected by a second user as a result of a second Internet search and the second plurality of WWW documents including a second web page;
   receiving a search request from the first user, the search request including search criteria; in response to receipt of the search request, searching the storage area to obtain a first result based on the search criteria and searching one or more content servers coupled to the Internet to obtain a second result based on the search criteria; and
   concurrently communicating the first result and the second result to the first user, the concurrently communicating including displaying the second web page to the first user upon determination that the first collection and the second collection are associated with a same group;
   wherein at least one WWW document of the first plurality of WWW documents is automatically stored to the storage area without any action from the first user while the at least one WWW document is being viewed.

2. The method of claim 1, wherein the first plurality of WWW documents comprises one or more documents identified by the first user for storage in the storage area.

3. The method of claim 1, further comprising:
   allowing the first user to elect receiving either the first result or the second result.

4. The method of claim 1, further comprising:
   communicating an Internet web page including the first result and the second result via the Internet to the first user.

5. The method of claim 1, further comprising:
   allowing the first user to rank the first plurality of WWW documents stored in the storage area.

6. The method of claim 1, further comprising:
   allowing, prior to storing a document into the storage area, the first user to provide notations in the form of text comments to the document.

7. The method of claim 6, further comprising:
   searching the notations in response to receiving the search request from the first user; and
   displaying the notations with the first results to the first user.

8. The method of claim 1, further comprising:
designating access privileges to the first plurality of WWW documents stored in the storage area; and
checking the access privileges of the user prior to storing the first plurality of WWW documents and prior to communicating the first result to the first user.

9. The method of claim 1, further comprising:
displaying to the first user at least the first result; and
displaying to the first user at least one document identified by the first result, including a name of a user who selected the at least one document for storage into the storage area.

10. The method of claim 1, further comprising:
receiving the search request at a search engine via the Internet from a content browser on a client machine, the first plurality of WWW documents stored in the storage area selected from a group consisting of email correspondence, HTML pages, digital images, and digital audio.

11. The method of claim 1, wherein the storage area is remote from a client computer, and wherein access to one or more of the plurality of WWW documents in the storage area is restricted.

12. The method of claim 1, further comprising:
storing the first and second plurality of WWW documents on a client computer.

13. The method of claim 1, further comprising:
monitoring selection of a portion of text in a web page by the first user; and
performing said searching based upon the selected portion of text.

14. A non-transitory machine-readable storage medium embodying instructions which, when executed by a machine, cause the machine to perform a method of providing search results via a private network coupled to an Internet via a firewall, the method comprising:
storing a first plurality of World Wide Web (WWW) documents into a first collection in a storage area of the private network, the first plurality of WWW documents having been previously viewed and selected by a first user as a result of a first Internet search and the first plurality of WWW documents including a first web page, access from the Internet to the first plurality of WWW documents being restricted via the firewall;
storing a second plurality of WWW documents into a second collection in the storage area, the second plurality of WWW documents having been previously viewed and selected by a second user as a result of a second Internet search and the second plurality of WWW documents including a second web page;
receiving a search request from the first user, the search request including search criteria; in response to receipt of the search request, searching the storage area to obtain a first result based on the search criteria and searching one or more content servers coupled to the Internet to obtain a second result based on the search criteria; and
concurrently communicating the first result and the second result to the first user, the concurrently communicating including displaying the second web page to the first user upon determination that the first collection and the second collection are associated with a same group;
wherein at least one WWW document of the first plurality of WWW documents is automatically stored to the storage area without any action from the first user while the at least one WWW document is being viewed.

15. A system to provide search results via a private network coupled to an Internet via a firewall, the system comprising:
a storage area located on a storage device or storage system of the private network to store a first plurality of WWW documents into a first collection, the first plurality of WWW documents having been previously viewed and selected by a first user as a result of a first Internet search and the first plurality of WWW documents including a first web page, access from the Internet to the first plurality of WWW documents being restricted via the firewall, the storage area to store a second plurality of WWW documents into a second collection, the second plurality of WWW documents having been previously viewed and selected by a second user as a result of a second Internet search and the second plurality of WWW documents including a second web page;
a search engine to receive a search request from the first user, the search request including search criteria, the search engine to search, in response to receipt of the search request, the storage area to obtain a first result based on the search criteria, the search engine further to search one or more content servers coupled to the Internet to obtain a second result based on the search criteria; and
an interface to concurrently communicate the first result and the second result to the first user, the concurrently communicating including displaying the second web page to the first user upon determination that the first collection and the second collection are associated with a same group;
wherein at least one WWW document of the first plurality of WWW documents is automatically stored to the storage area without any action from the first user while the at least one WWW document is being viewed.

16. The system of claim 15, wherein the first plurality of WWW documents comprise documents previously identified by the first user for storage in the storage area.

17. The system of claim 15, wherein the first plurality of WWW documents comprises a web document previously accessed by a member of a group with which the user is associated and identified by the member of the group for storage in the storage area.

18. The system of claim 15, wherein the interface is configured to communicate an Internet web page including the first result and the second result via the Internet to the first user.

19. The system of claim 15, wherein the first plurality of WWW documents are ranked and the web result and the restricted result are communicated to the first user based on the ranking.

20. The system of claim 15, wherein the first plurality of WWW documents include user provided notations in the form of text comments, the notations being searchable by the search engine.

21. The system of claim 15, wherein the first plurality of WWW documents are subject to access privileges defined by the first user.

22. The system of claim 15, wherein the search request is received at the search engine via the Internet from a content browser on a client machine and the associated document is selected from the group consisting of email correspondence, HTML pages, digital images, and digital audio.

23. A system for providing search results via a private network coupled to an Internet via a firewall, the system comprising:
a storage area located on a storage device or storage system of the private network to store a first plurality of WWW documents into a first collection, the first plurality of WWW documents having been previously viewed and selected by a first user as a result of a first Internet search and the first plurality of WWW documents including a first web page, access from the Internet to the first plurality of WWW documents being restricted via the firewall, the storage area to store a second plurality of WWW documents into a second collection, the second plurality of WWW documents having been previously viewed and selected by a second user as a result of a second Internet search and the second plurality of WWW documents including a second web page;

means for receiving a search request from the first user, the search request including search criteria, the means for receiving to search, in response to receipt of the search request, the storage area to obtain a first result based on the search criteria, the means for receiving further to search one or more content servers coupled to the Internet to obtain a second result based on the search criteria; and means for concurrently communicating the first result and the second result to the first user, the concurrently communicating including displaying the second web page to the first user upon determination that the first collection and the second collection are associated with a same group;

wherein at least one WWW document of the first plurality of WWW documents is automatically stored to the storage area without any action from the first user while the at least one WWW document is being viewed.

24. The method of claim 1, wherein the first plurality of WWW documents were previously received into a collection, the collection being stored in the storage area.

25. The non-transitory machine-readable storage medium of claim 14, wherein the first plurality of WWW documents were previously received into a collection, the collection being stored in the storage area.

26. The system of claim 15, wherein the first plurality of WWW documents being associated with the first user were previously received into a collection, the collection being stored in the storage area.

27. The method of claim 1, wherein in storing the first plurality of WWW documents into the storage area they are stored in a user table associated only with the first user, wherein the user table indicates at least three different privacy levels associated with the first plurality of WWW documents, and wherein the privacy levels include public, private, and semi-private.

28. The method of claim 1, wherein in storing the first plurality of WWW documents into the storage area they are stored in a group table associated with a group of users including the user, wherein the group table stores documents having been previously viewed and selected by all members of the group, wherein the group table indicates at least three different privacy levels associated with the first plurality of WWW documents, and wherein the privacy levels include public, private, and semi-private.

29. The method of claim 1, wherein the storing the first plurality of WWW documents into the storage area is performed using a user interface that comprises:
- a group selection element with which to add a document to a collection associated with a particular group;
- a privacy level selection element with which to assign a privacy level, wherein the privacy levels include public, private, and semi-private;
- a ranking selection element with which to assign a ranking to a document, wherein rankings include high ranks and low ranks;
- a notation element with which a text comment may be added to a document; and
- a store document element with which to activate storage of a document into the storage area.

30. The method of claim 1, wherein the communicating the first result and the second result to the user is performed using a user interface that displays a plurality of different groups of search results including:
- a group of documents originating from the first user;
- a group of documents originating from another user;
- a group of documents originating from a group of users of which the user is a member; and
- a group of documents originating from the one or more content servers.

31. The method of claim 30, wherein the group of documents originating from the group of users are ranked based upon the user name, and wherein documents originating from a first user are ranked higher than those originating from a second user.

32. The method of claim 30, wherein the group of documents originating from the user are ranked based upon rankings assigned by the first user when the documents were viewed and selected by the first user.

* * * * *